No. 732,480. Patented June 30, 1903.

UNITED STATES PATENT OFFICE.

KNUT C. WIDEEN, OF BROOKLYN, NEW YORK, ASSIGNOR TO CARBON-HYDRATE CHEMICAL COMPANY, OF NEW YORK, N. Y., A CORPORATION OF NEW JERSEY.

PROCESS OF OBTAINING CARBON COMPOUNDS.

SPECIFICATION forming part of Letters Patent No. 732,480, dated June 30, 1903.

Application filed September 11, 1902. Serial No. 123,023. (Specimens.)

*To all whom it may concern:*

Be it known that I, KNUT C. WIDEEN, a subject of the King of Sweden and Norway, residing in the borough of Brooklyn, county of Kings, city and State of New York, have invented a certain new and useful Improved Process of Obtaining a Carbon Compound Having the Formula $C_{10}H_{16}O$, of which the following is a specification.

According to my improved process I obtain this valuable carbon compound from ethylene or from acetylene.

The complete process may be said, in general terms, to consist in the treatment of acetylene with reducing agents to produce a hydrocarbon having the general formula $C_{10}H_{14}$, which by treatment with steam is converted into $C_{10}H_{16}O$, the desired product.

A specific example of the process embodying my invention is as follows: A suitable quantity of calcium carbid $(CaC_2)$ is put into a vessel with sufficient water to decompose it into acetylene $(C_2H_2)$ and calcium oxid, $(CaO.)$ For example, to produce ten thousand cubic feet of acetylene about one ton of carbid will be used. The acetylene gas thus formed is then passed through or into contact with a solution of a reducing salt, (that is to say, a salt which gives up hydrogen,) as a double salt of ammonium and chromosulfate of the protoxid type, as indicated by the general formula CrO—for example, $$(NH_4)_2SO_4 + CrSO_4 + water.$$

This solution absorbs the acetylene gas $(C_2H_2)$ and converts it into ethylene gas $(C_2H_4)$ in the solution. The reducing agent is at the same time oxidized to form a compound of the oxid type. The nascent hydrogen which is taken up to form ethylene can be renewed by the action of dilute sulfuric acid on iron or zinc. The ethylene gas thus produced, or, in fact, ethylene gas which shall have been produced in any other suitable manner, is then passed over or through a heated mass of parabromisopropylbenzene.

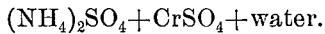

is immediately thereafter passed over heated sodium, and is thence introduced into intimate contact with superheated steam, $(H_2O.)$ The product is the desired carbon compound having the general formula $C_{10}H_{16}O$ and a certain quantity of water. The exact reactions which take place during this portion of the process are not certainly known to me. I believe, however, that the passing of the ethylene over the parabromisopropylbenzene results in the formation of isoprhene, $(C_5H_8,)$ while the passing of the isoprhene over the heated sodium produces a hydrocarbon having the general formula $C_{10}H_{14}$, this being converted into $C_{10}H_{16}O$ by the direct addition of a portion of the steam, $(H_2O.)$ Care should be taken to maintain an even heat throughout the treatment with parabromisopropylbenzene and sodium. The steam should be superheated, preferably, to above 550° Fahrenheit. The mass may, if desired, be heated during the transformation from acetylene into ethylene slightly—say to 100° Fahrenheit—in order to hasten the process. This is not, however, essential.

My process is very rapid, being a continuous process throughout.

An important feature of the process is the treatment of ethylene with liquid parabromisopropylbenzene and the immediate passing of the resultant product through heated sodium at substantially the same temperature. The sodium should be treated continuously with a spray of very dilute sulfuric acid.

Though I have described with great particularity of detail a specific process embodying my invention, yet it is not to be understood that the invention is limited to the specific process described. Various modifications thereof are possible to those skilled in the art without departure from the spirit of the invention.

My improved product may be advantageously used in the manufacture of celluloid and for disinfecting purposes.

What I claim is—

1. The process of converting acetylene into a carbon compound having the general formula $C_{10}H_{16}O$, which consists in treating it with a reducing salt to form ethylene, and passing the ethylene over parabromisopropylbenzene, thence over heated sodium, and finally into contact with steam.

2. The process of converting acetylene into a carbon compound having the general formula $C_{10}H_{16}O$, which consists in passing the same through a solution of a double salt of ammonium and chromo sulfate of the protoxid type to form ethylene, and passing the ethylene in rapid succession over a heated mass of parabromisopropylbenzene, thence over heated sodium, and thence into intimate contact with superheated steam.

3. The process of reducing ethylene to a carbon compound having the general formula $C_{10}H_{16}O$, which consists in passing the ethylene over parabromisopropylbenzene and thence over heated sodium, and thence into contact with steam.

4. The process which consists in passing ethylene over parabromisopropylbenzene, and thence over heated sodium to produce a hydrocarbon having the general formula $C_{10}H_{14}$.

5. In the obtaining of a carbon compound having the general formula $C_{10}H_{16}O$ from ethylene, the subprocess which consists in passing the ethylene over parabromisopropylbenzene.

In witness whereof I have hereunto signed my name in the presence of two subscribing witnesses.

KNUT C. WIDEEN.

Witnesses:
   FRED WHITE,
   THOMAS F. WALLACE.